United States Patent [19]
Scholz

[11] 3,848,977
[45] Nov. 19, 1974

[54] MULTIPURPOSE, AUDIO-VISUAL CASSETTE SYSTEM

[75] Inventor: Donald T. Scholz, Watertown, Mass.
[73] Assignee: Polaroid Corporation, Cambridge, Mass.
[22] Filed: June 28, 1973
[21] Appl. No.: 374,578

[52] U.S. Cl.................. 352/14, 352/72, 226/42, 226/44
[51] Int. Cl. ........................................ G03b 31/06
[58] Field of Search ............ 352/14, 27, 29, 72, 78, 352/130, 159; 226/42, 44

[56] References Cited
UNITED STATES PATENTS

| | | | |
|---|---|---|---|
| 3,244,470 | 4/1966 | Hennessey et al. | 352/72 X |
| 3,442,580 | 5/1969 | Winkler | 352/72 X |
| 3,537,784 | 11/1970 | Downey | 352/130 |
| 3,561,655 | 2/1971 | Kogandort | 226/44 |
| 3,576,361 | 4/1971 | Kakiuchi | 352/157 |
| 3,597,056 | 8/1971 | Sasaki | 352/14 |
| 3,694,060 | 9/1972 | Tadie | 352/14 |
| 3,746,438 | 7/1973 | Misawa et al. | 352/29 |

*Primary Examiner*—Samuel S. Matthews
*Assistant Examiner*—Alan Mathews
*Attorney, Agent, or Firm*—David R. Thornton

[57] ABSTRACT

A sound motion-picture system employing a film handling cassette within which the film is retained throughout all photographic and audio operations. The film handling cassette includes both an audio station and an exposure-projection station, and the camera and viewer apparatus includes a pair of drive arrangements for progressively advancing incremental sections of such film across the exposure-projection station and for substantially uniformly advancing the film strip through the audio station. To isolate these different film motions, the drive arrangements cooperate with the cassette to provide a free loop of film extending exteriorly of the cassette. A sensing element monitors the loop of film and adjusts one of the drives so as to retain the loop within predetermined limits. In the camera, the audio drive is coupled to the start switch so as to displace the audio drive into a standby position when the camera is not being operated. Additionally, means are provided for eliminating the loop so as to facilitate removal of the cassette from the appparatus.

19 Claims, 14 Drawing Figures

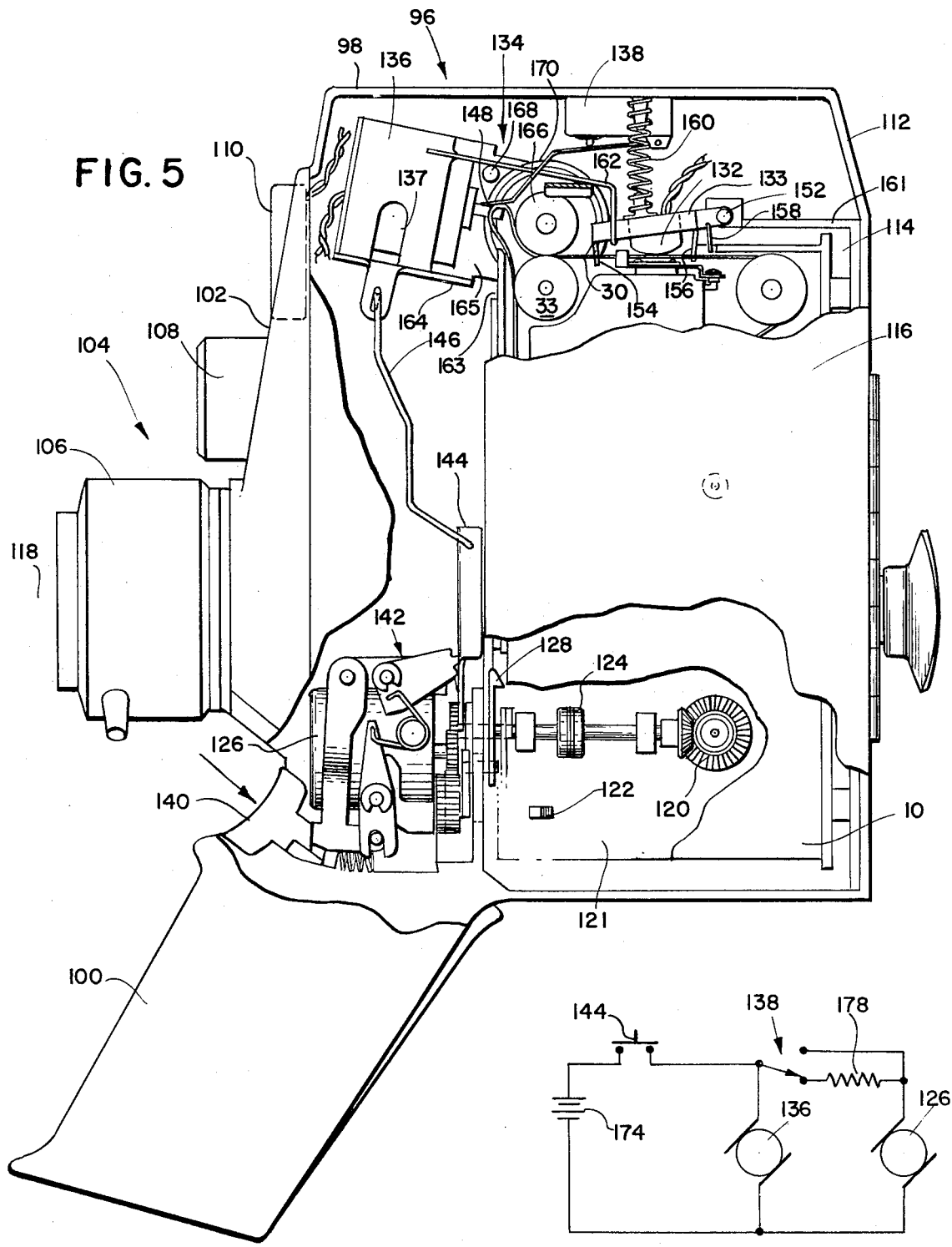

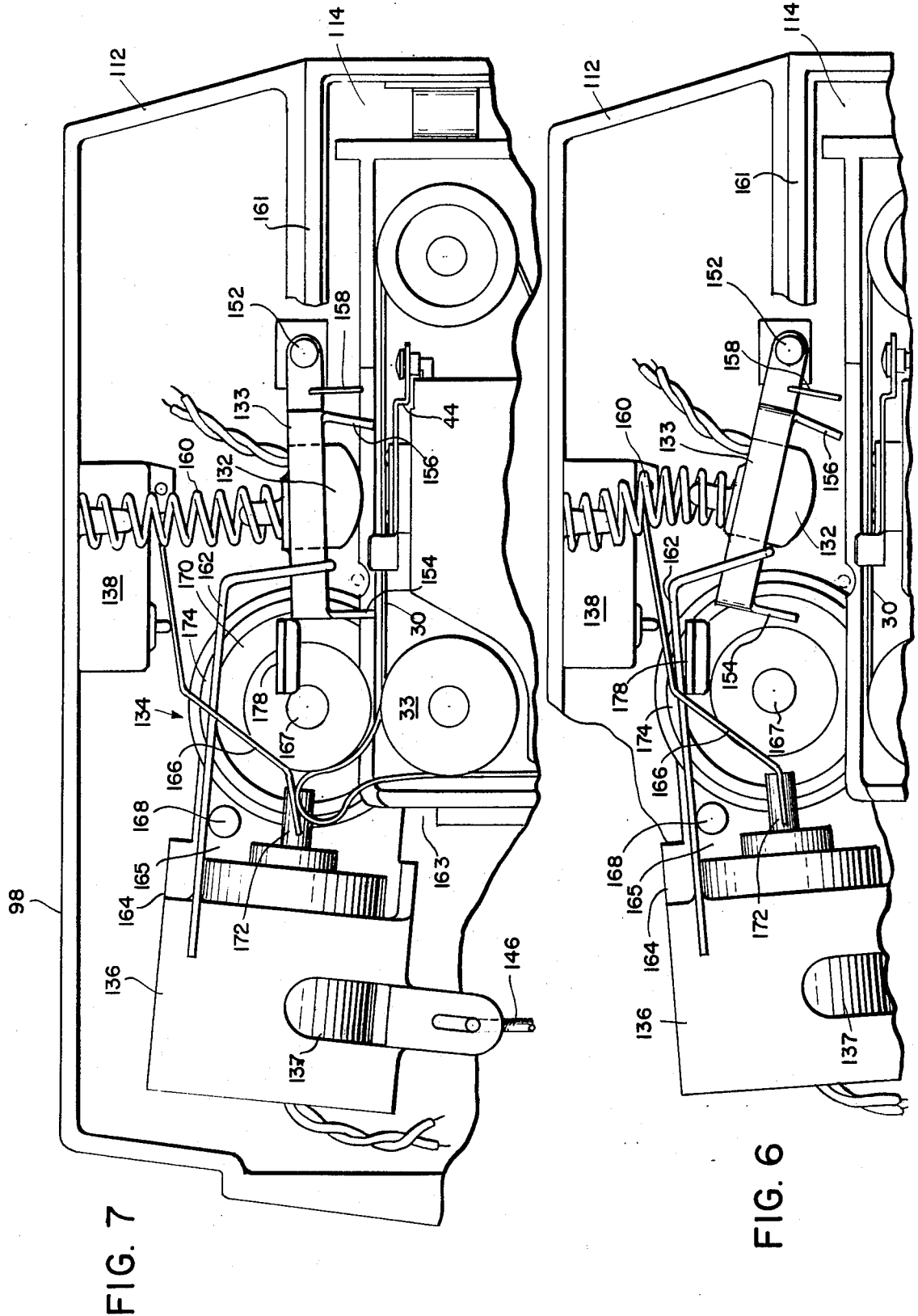

MULTIPURPOSE, AUDIO-VISUAL CASSETTE SYSTEM

BACKGROUND OF THE INVENTION

1. Field of the Invention

This invention relates to a photographic system and more particularly to an improved sound motion-picture system employing a multipurpose film handling cassette in which the film is retained throughout both the audio and the photographic programs.

2. Description of the Prior Art

Recent important technological advantages have made it possible to provide multipurpose motion-picture cassettes from which the film need not be removed during exposure, processing and projection operations. Exemplary of such new and unique systems are those described in prior U.S. Pat. No. 3,615,127 of Edwin H. Land issued Oct. 26, 1971; U.S. Pat. No. 3,600,071 issued to Rogers B. Downey on Aug. 17, 1971; and U.S. Pat. No. 3,604,790 issued to Rogers B. Downey on Sept. 14, 1971. Each of the systems described in the aforementioned patents employs a cassette from which the film need not be removed during exposure, processing and projection operations. In these systems, the cassette is operated in a camera for exposure of the film strip and then subsequently loaded into a projector apparatus which first subjects the cassette to a sequence of operations intended to process the film strip to a viewable condition and then subsequently projects the developed recorded images.

Advantageously, audio operations may also be included in this cassette system. Exemplary of such an audio visual system is described in prior U.S. Pat. No. 3,604,790 of Rogers B. Downey issued Sept. 14, 1971. The latter patent describes a film handling cassette in which the film is permanently retained during exposure, processing, sound recording, sound playback and projection operations. While the system of the above noted patent provides a satisfactory audio-visual system, it provides a cassette having a centrally located audio station which increases cassette size and requires substantially complete insertion of the cooperative audio elements, such as the sound head, of the camera or other apparatus within the confines of cassette housing during cassette operation.

Hence, it is desirable to minimize the structural arrangement of both the cassette and its operational apparatus so as to simplify the cassette-apparatus interface and to provide an efficient, reliable system capable of substantially automatic operation.

Consequently, it is a primary object of this invention to provide an improved audio-visual cassette system.

Another object of this invention is to provide an improved compact multipurpose film handling cassette in which the strip of motion picture film is permanently retained and in which the film can be exposed, processed and projected and in which sound information can be first recorded on the film and subsequently extracted therefrom.

A further object of this invention is to provide photographic apparatus configured for cooperation with a film handling cassette for performing photographic and audio operations therewith.

A still further object of this invention is to provide a photographic camera adapted for simultaneous recording of both visual and audio information.

An additional object of this invention is to provide projector apparatus adapted for substantially automatic processing and projecting a film strip as well as performing of audio operations therewith.

BRIEF DESCRIPTION OF THE DRAWINGS

The novel features that are considered characteristic of the invention are set forth with particularity in the appended claims. The invention itself, however, both as to its organization and its method of operation together with additional objects and advantages thereof, will best be understood from the following description of the preferred embodiments when read in connection with the accompanying drawings wherein like numbers have been employed in the different figures to denote the same parts and wherein:

FIG. 5 is a view in elevation partially cut away of a camera embodying features of this invention and employing the cassette illustrated in FIG. 1;

FIG. 6 is a view in elevation of the camera audio mechanism illustrating its disengaged position;

FIG. 7 is a view in elevation of the camera audio mechanism illustrating the standby position of the latter;

FIG. 8 is a schematic diagram illustrating a portion of the motor control circuit employed in the camera shown in FIG. 5;

SUMMARY OF THE INVENTION

The photographic system of this invention briefly comprises a compact audio-visual cassette which includes a strip of motion picture film carrying a sound track. The film is permanently retained within the cassette housing and the latter includes an exposure-projection station, a normally inoperative processing station, and an audio station. The apparatus, designed to cooperate with the cassette so as to operate it through the different programs comprises means for receiving the cassette in an operative location within the apparatus, first drive means for cooperating with such audio station of such cassette to substantially constantly advance the film strip through the latter station, second drive means for cooperating with the cassette so as to intermittently advance the film strip through the exposure-projection station, and means for selectively activating the first and second drive means and for bringing the second drive means into pressure engagement with the film strip so as to provide an audio program therewith during advancement of the film strip through the projection station.

Cooperation of the cassette with the drive means of the camera or projector provide an isolating film loop exteriorly of the cassette and between the sound station and the projection station. Means, responsive to the loop size, are provided for controlling the drive means so as to form and thereafter maintain a predetermined loop size extending exteriorly of the cassette.

Additionally, the apparatus also includes means for eliminating the film loop so as to facilitate withdrawal of the cassette from the apparatus. In one embodiment, a film protuberance which cooperates with the cassette processing station to partially activate the latter, is engaged by a stop member of the apparatus so as to prevent further displacement of the film towards the projection station, and thus, elimination of the film loop at the completion of the program. In another embodiment, the intermittent drive is automatically activated just prior to cassette removal, while the constant speed drive is rendered inoperative to advance the film strip so as to thereby eliminate the free film loop.

DESCRIPTION OF THE PREFERRED EMBODIMENT

Figure 1:
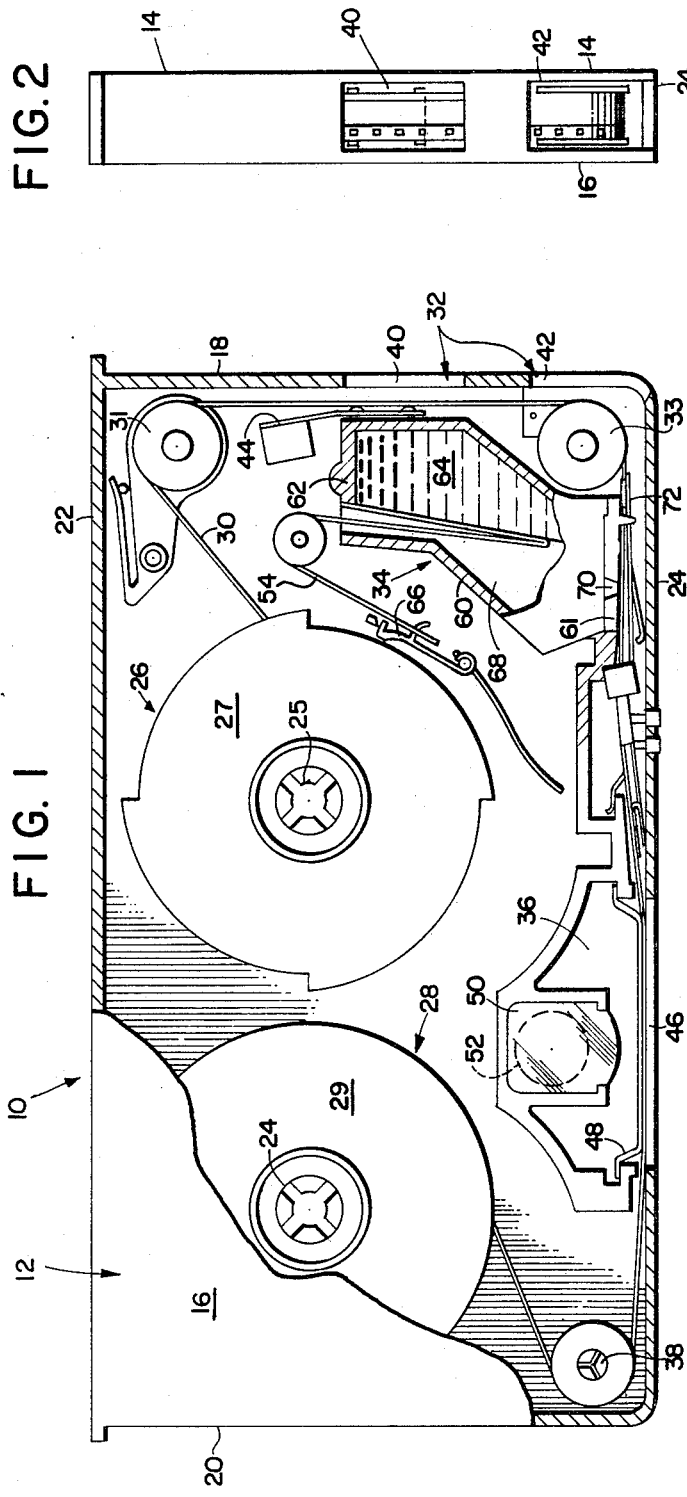
FIG. 1 is a diagrammatic view in elevation, partially cut away to show the interior, of a compact multipurpose film handling cassette embodying features of this invention.

In the illustrated embodiment of this invention which may be best understood by first referring to FIG. 1 of the drawing, a multipurpose film handling cassette 10 is employed. The cassette 10 comprises a generally parallelepiped casing or housing 12 constituted by a pair of planar sidewalls 14 and 16 joined together at their edges by end walls 18 and 20 and elongated top and bottom edge walls 22 and 24.

The illustrated cassette is similar to that described in the commonly assigned copending patent application Ser. No. 227,092 of John F. Batter, Jr. et al, filed Feb. 17, 1973. In this cassette arrangement, the several operations of exposure, chemical processing, drying and projection of the recorded images is accomplished without transferring the film from its cassette. In this structure, processing of the film is automatically initiated responsive to film movement at a given time during the cassette operation. To accomplish this, the film spools and the film itself are operatively associated with the processor as explained below.

As shown in FIG. 1, a supply spool or reel 26 and a take-up spool or reel 28, to which opposite ends of a photographic film strip 30 are affixed, are coplanarly mounted within housing 12 for rotation about parallel axes. Each reel 26 and 28 includes a pair of flanges, only the upper of which is shown at 27 and 29 to guide the film strip 30 as the latter is coiled on the reels.

In its path from the supply reel 26, the film strip 30 first encounters a bobulator roller 31, engaging a portion of its periphery as shown, and passes therefrom across an audio station 32, which includes an idler roller 33, and thence through a film processing station 34.

Beyond the film processing station 34, the film 30 extends through an exposure-projection station 36, next passes over a snubber roller 38 and finally passes to the take-up reel 28.

Figure 2:
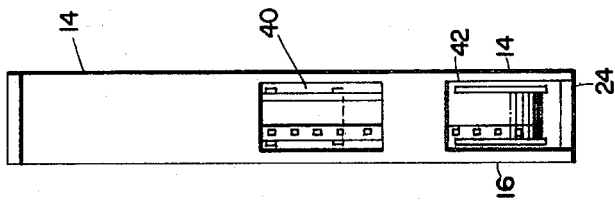
FIG. 2 is an end view of the cassette shown in FIG. 1.

The audio station 32 is located in end wall 18 and comprises a pair of openings 40 and 42, shown more clearly in FIG. 2, which are designed to accommodate a sound-head e.g. a magnetic recording and reproducing head and sound-drive capstan as later explained in more detail with respect to FIG. 5. Additionally, the sound station 32 includes a support element 44 which resiliently supports the film as it passes beneath opening 40.

As previously indicated, the film strip 30 is exposed, processed and projected without removal from the cassette. Prior to describing the processing station and its operation, the projection station will be described with respect to FIG. 1. The projection station 36 includes an opening 46 in the bottom wall 24 which functions to permit image bearing light rays to impinge upon progressive incremental sections of the film strip 30 when the cassette is operated in a camera (later described with respect to FIG. 5) and to subsequently permit light rays from an external source to be directed through the incremental sections of the film strip and outwardly of the cassette for projection operations when the cassette is operated in a projector (later described with respect to FIG. 12). Hence, the opening 36 first comprises an exposure station and subsequently a projection station of the cassette 10. To facilitate these functions a pressure plate 48 and a prismatic reflector element 50 are mounted behind opening 70. Additionally, an aperture 52, shown in dotted lines, is provided in side wall 14 to permit entrance of a projection beam.

As previously indicated, the film processing station 34 is activated and controlled by the film strip 30 and the supply reel 26. In this arrangement, the processing station 34 includes a fluid reservoir 62 from which fluid is released responsive to displacement of a release tab shown at 54. This release tab 54 is drawn from the processor by operation of the supply reel 26 in a clockwise direction as shown in FIG. 1. The latter motion of the reel 26 is achieved during rewind of the film from the take-up reel 28.

The film processing station, fragmentarily shown in FIG. 1, generally comprises a housing 60 which includes a reservoir or internal chamber 62 containing a fluid 64. The release tab or tear tab 54 extends from the reservoir 62 back upon itself and out of the processing station 34 to an actuating assembly 66 which is coupled to the supply reel flange 27 such that upon rewind of the film 30, the tear tab 54 is torn from its sealing position on the reservoir 62 to release the fluid 64 within the processing station 34.

The base of the processor housing 60 includes a chamber 68 which is designed to receive the fluid 64 when the latter is released from reservoir 62. A nozzle opening 70 communicates between the chamber 68 and the portion of the film strip 30 passing beneath the processor station such that during processing operation the fluid 64 is permitted to pass to the film strip 30 and coat its entire length. During this coating operation a support pad 72 urges the film strip 30 into contact with the base 61 of the processor housing 60. Initially, the pad 72 is stored in an inoperative, non-processing position and is selectively displaced to an operating position for the processing operation by means of the film strip whose structure is described in detail with respect to FIG. 3.

Figure 3:
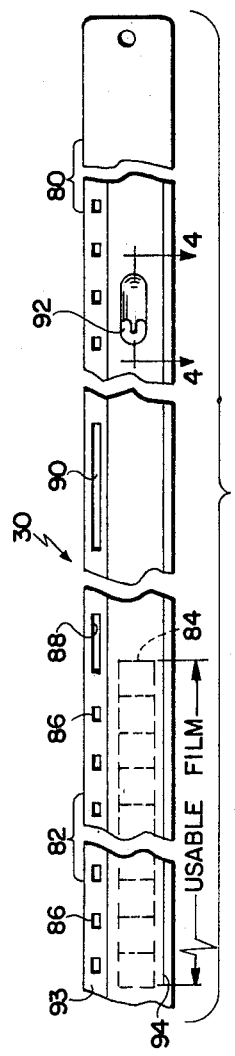
FIG. 3 is a plan view of a portion of the film strip employed in the cassette shown in FIG. 1.

Broadly, the film 30 comprises a base of any suitable transparent material of the kind conventionally used for film bases. This base is coated at least over a portion thereof with a photosensitive coating of any conventional variety adapted to be developed by a monobath processing composition to form a positive transparency suitable for projection. The supply end of the film is illustrated in FIG. 3 is viewed from the base side, or that is, the exterior side of the film when it is mounted in the cassette, and the emulsion is on the opposite side. On this base is applied, at least over the central portion of the photographically usable length 82, an emulsion comprising a photosensitive coating, whereon a series of latent images illustrated by a series of frames 84 may be formed with a suitable camera. The film 30 is formed along one edge with sprocket holes, such as at 86, at regular intervals adapted to cooperate with a drive pawl (in a manner to be described) in either a camera or projector, for incremental advancement of the film. The series of sprocket holes 86 adjacent the trailing end 80 of the film is interrupted by a first elongated sprocket hole 88, which by way of example, may span two of the sprocket holes 86. Further along the film in the direction of the supply reel end, the series of sprocket holes 84 is again interrupted by a second elongated sprocket hole 90, which is longer than the sprocket hole 88 and, for example, may span three of the later sprocket holes. As later described in detail, the first elongated sprocket hole 88 establishes an exposure end point (terminating advance of the film in the camera) whereas the second sprocket hole 90 determines a film take-up termination point in the projection apparatus.

The use of two different termination points following exposure and projection is employed to faciliate processing of the film strip 30. For the latter purpose, the trailing end 80 of the film carrier discontinuity, in this case, a protruberance or detent engaging element 92 which forms a projecting bump or hook, seen more clearly in FIG. 3a, adapted to engage the film pressure pad 72 and to displace the latter pad into operative engagement with the film during initiation of the processing operation in the projector.

A pair of raised tracks 93 and 94 are provided along the lateral margins of the strip 30. These tracks 93 and 94 space adjoining turns of the film from one another when the latter is coiled on the film reels so as to preclude disturbance of the processing fluid layer applied, as later explained, during the processing operation. For audio operations, one track 94 includes magnetic material suitable for sound recording.

Prior to describing the overall operation of the cassette 10, the camera apparatus will be described with reference to FIG. 5. As can be seen from the latter figure, the camera 96 comprises a housing 98 which includes a supporting pistol grip handle designated at 100. At the leading end 102 of the camera housing 98 is an exposure mechanism 104 which consists of a lens-shutter mechanism designated at 106 and a light sensitive, aperture control means 108. Also mounted on the leading edge 102 of the housing is a microphone unit designated at 110.

Towards the trailing end 112 of the camera housing 96 is a cassette-receiving pocket 114. A door member 116 is provided to enclose the cassette 10 when it is properly inserted within the pocket 114 as shown. The cassette-receiving pocket 114 is designed to receive the cassette 10 such that its exposure-process opening 46 is aligned with the optical axis 118 of the lens assembly 106 so as to appropriately expose an incremental portion of the film strip 30 when it is presented in the exposure-projection aperture 46. A shuttle or claw mechanism 128 is located in the pocket 114 so as to enter the cassette opening 46 and engage the film 30. Further, the hub 29 of the take-up spool 28 is in engagement with a spool drive spindle 120 which is mounted in the bottom or base 121 of the pocket 114 and the snubber roller 38 of the cassette 10 is in engagement with a snubber member or latch 122. The latter precludes rotation of the snubber roller as later explained in detail with respect to operation of the camera. The spindle 120 is appropriately driven through a clutch 124 by means of a drive motor 126 and, as later explained in detail, in conjunction with a claw mechanism, also driven from motor 126, intermittently advances the film strip 30 within the cassette from the supply spool to the take-up spool.

In the camera, the snubber roll 38 is stopped by engagement of its hub 39 with a snubber latch 122. When the snubber roll is appropriately stopped, operation of the claw mechanism 128 incrementally advance the film towards the take-up spool 28, by engagement of the claw with the sprocket holes in the film 30, will momentarily loosen the film from engagement with the stationary snubber roll 38 and allow the slip clutch 124 driving the take-up spool 28 to take up that increment of the film advanced by the pawl. Accordingly, between engagements of the claw, the snubber arrangement in conjunction with the slip clutch 124 prevents the take-up spool 26 from advancing the film and from thereby interferring with the intermittent advancement.

Figure 10:
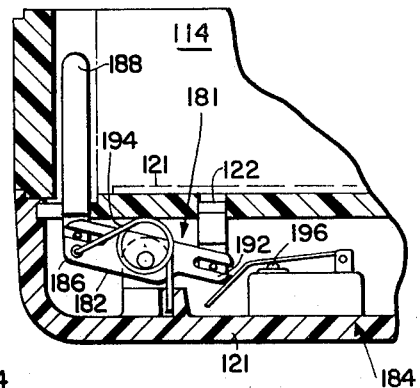
FIG. 10 is a view in elevation illustrating another operational position of the control elements shown in FIG. 9.

As later explained, arrangements are provided in one embodiment of the camera shown in FIG. 10 and in the projector apparatus to release the snubber roll 38 for particular purposes. That is, it may be employed in the camera to eliminate the free film loop at the end of the film run. In the projector apparatus, as later explained with regards to FIG. 13, the snubber latch is disengaged during rewind of the film strip to the supply spool 26 such that the snubber roll 38 acts as a simple idler roll. As will appear, this disengagement occurs during rewinding of the film.

Prior to completing the description of the intermittent advancement of the film strip, the audio mechanism also included within the camera housing will be described. Essentially, the audio mechanism, designated at 130, comprises a magnetic head 132, a capstan-drive arrangement 134 which is operatively coupled to a capstan drive motor 136, and a loop sensor or loop control switch 138.

Overall operation of the camera is controlled by a trigger member 140, positioned within the handle 100. The trigger 140 is coupled through a lever mechanism 142 to a slide switch 144 which activates the electrical operation of both the claw motor 126 and the capstan drive motor 136. In this respect, the camera handle 100 includes batteries or other electrical power source which is coupled through the switch 144 to both of the motors 126 and 136 on appropriate inward displacement of the trigger 140. As later explained, the control switch 140 is also mechanically coupled to the capstan drive motor 136 by means of a linkage designated at 146 such that upon depression of the trigger in the direction shown by the arrow shown in FIG. 4, the capstan drive motor 136 is also released so as to bring the capstan mechanism 134 and the sound-head 130 into pressure contact with the cassette film strip 30.

In FIG. 5, the cassette camera operation is shown in an operating mode with a film loop 148 extending from the cassette through its opening 42 and in adjoining relation to the capstan mechanism 134. Both, the loop 148 and audio mechanism 130 operate through an opening 163 in one wall 161 of the camera pocket 114.

Figure 4:
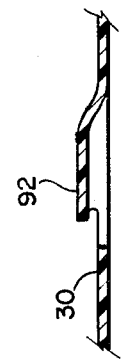
FIG. 4 is a sectional view taken along lines 4—4 of the film strip shown in FIG. 3.

As shown in FIGS. 4, 6 and 7, the sound-head 132 is carried by a support 133 which is pivotally mounted at 152 so as to permit pivotal displacement of the head 132 from a position partially within the cassette-receiving pocket 114 (see FIGS. 5 and 7) and a position where it is wholly displaced from the cassette-receiving pocket 114 as shown in FIG. 6. Carried on the head support member 133 are a pair of spaced side guides 154 and 156 which laterally located the film beneath the sound-head 132. Additionally, a stop member 158 depends from the head support so as to cooperate with the film discontinuity 92, as later explained in regards to the overall operation of the camera. A spring 160 biases the head support member 133 towards the cassette-receiving pocket 114 and the capstan drive mechanism 134 is coupled to the head support member 133 by means of bracket 162 so as to allow joint displacement of both.

The drive motor 136 of the capstan mechanism 134 includes a bracket assembly 164, the bottom of which is shown at 165 in FIGS. 5, 6 and 7, which supports both the motor 136 and a capstan spindle 167 which carries a drive capstan 166. The bracket 164 is pivotally mounted as at 168 to permit pivotal motion of the motor and capstan in conjunction with the head 132 towards and away from the cassette pocket 114. Mounted on the spindle 166 is the capstan 166 and a drive disc 170. The latter is coupled to and driven by a drive shaft 172 of the motor 136 Coupling between the drive disc 170 and the motor shaft 172 is provided by a frictional element, e.g. a rubber tire-like arrangement 174, which is positioned in the upper face of the drive disc 170.

Initially, as shown in FIG. 6, the capstan 134 is displaced outwardly of the cassette pocket by means of a displaceable stop member 178 which takes the form of a cantilever spring, or the like. This stop 178 extends upwardly to engage the bracket 162 so as to hold the capstan 166 and also the head 132 completely disengaged from the cassette 10 when the camera door 116 is in an open position. Closing of the door 116 engages and displaces the spring stop 178 towards the cassette-receiving pocket 114 so as to release the capstan mechanism 134 which under the bias of the spring 160 is urged towards a standby position, shown in FIG. 7, where the capstan 166 and the head 132 are held just out of pressure engagement, e.g. approximately 0.010 inch away from the film, under the influence of the trigger linkage 146.

The operation of the camera 96 will now be explained in detail. As previously indicated, prior to insertion of the cassette in the cassette-receiving pocket 114, the capstan assembly 134 and the head 132 are displaced out of the pocket against the pressure of the spring 160 by virtue of the stop 178. Once the cassette is inserted in the pocket 114 and the door 116 of the camera is closed, the stop 178 is displaced towards the pocket due to contact of the door. This releases the capstan bracket 162 so as to permit the capstan 166 and the head 132 to be displaced towards the cassette pocket 114 and to enter the cassette 10 as shown in FIG. 7. This position represents a standby position in which the capstan 166 and the head 132 are held slightly out of engagement (at least not in pressure contact) with the film 30 and represents the capstan and head position when the camera is fully loaded but is not actually undergoing exposure and sound operations. As noted above, the capstan 134 and the head 132 are held in this standby position by means of the linkage 146 which is coupled to a motor bracket 137 so as to permit complete release of the capstan assembly 134 only when the camera trigger 140 is depressed.

Once the cassette has been loaded in the camera 96 and the door 116 closed, operation ensues by depressing trigger 140. This displaces slide switch 144 to energize the motors 126 and 136 and to displace the cable extension 146 which, as shown in FIG. 5, releases the capstan assembly 134 along with the head 132 into film engagement. At this time, the shutter mechanism, not shown, is released and driven from the claw drive motor 126 so as to permit light rays from the scene being photographed to be focused by the camera lens assembly 106 through the cassette opening 46 onto the film strip 30 as it is incrementally advanced by the claw 128. At this time, the drive motor 136 through the capstan 166 draws the film at a substantially constant speed across the sound-head 132. To provide a free loop of film and thereby isolate the continuous film motion at the sound-head 132 from the intermittent motion occurring at the exposure aperture, the motor 136 is designed to advance the film slightly faster than the intermittent film advancement. This rapid advancement towards the exposure-projection station causes an excess of film between the latter and the capstan 166, which excess follows a path of least resistance so as to form a free loop 148 of film extending through the capstan opening 42 of the cassette 10. The loop 148 continues to increase in size, during this initial operation until the loop control switch 138 is actuated to control the size of the loop as explained below with regards to FIG. 8. The loop extends through the cassette opening 42 rather than looping within the cassette because the film is retained or guided in a substantially flat condition beween the cassette processor 60 and the support pad 72 etc. between the opening 42 and the exposure station 36.

Referring now to FIG. 8, it can be seen that the operation of both the claw motor 126 and the capstan motor 136 are directly controlled through the slide switch which couples them to a camera battery 174. However, while motor 136 is controlled solely by this switch 144, the claw drive motor 126 is additionally controlled by the loop sensor switch 138, which in its inactive state, couples a resistor 172 in series with the motor 126 so as to thereby reduce the speed of the latter. Initially, the switch 138 couples the motor 126 to the battery 174 through resistor 172. This insures that the motor 126 (by means of the claw 128) will at this time advance the film strip 30 at a slower average rate than the motor 136 advances it by means of the capstan 166. As the film loop 148 continues to grow, it contacts the switch 138 which directly couples the battery 174 to the motor 126 such that the latter motor is driven at an increased speed, which advances the film at an average velocity slightly exceeding that provided by motor 136. This reduces the film loop so as to allow switch 138 to return to its normal position (coupling resistor 178 in the motor circuit) and allowing the film loop 148 to again grow in size until it activates the switch 138. In this way, the film loop 148 is formed and then maintained within narrow bounds.

As previously indicated the camera 96 includes a sound microphone 110 which is coupled (through appropriate circuitry, not shown) to the head 132 so that during advancement of the film strip sound occurring within the scene will be magnetically recorded on the film strip. In this way both audio and visual components are simultaneously recorded.

As previously indicated, it is desirable to eliminate the film loop 148 before removing the cassette 10 from the camera 96, at least at the completion of the length of film which is intended to be exposed. Inasmuch as the camera termination point is not at the complete end of the film, the film loop 148 will remain unless special precautions are taken. In the camera 96, the claw mechanism 128 ceases to advance the film when the claw reaches the first perforation 88. Hence, at this time even though the claw continues to operate, the film will no longer be advanced past the exposure aperture 46. However, as long as the trigger 140 remains depressed, the capstan drive 166 will continue to draw film from the supply spool 26. This means that the film loop 148 would remain at the end of the camera exposure operation. To prevent this occurrence, or that is, to eliminate the film loop 148 at the end of the exposure run, the stop member 158 is designed to engage the film bump 92 and thereby stop the capstan advancement of the film while the claw advancement continues. The film bump 92 is spaced a proper distance (approximately equal to the distance from the stop to the claw) from the film perforation 88 so that when the latter reaches the claw 128 no loop will remain.

Upon completion of the camera operation and opening of the camera door 116 to remove the cassette 10, the spring latch 178 automatically springs away from the pocket 114 so as to displace the capstan 166 outwardly of the pocket 114. This displacement, in turn, by means of the bracket arm 162 also carries the sound-head 132 from within the cassette 10 so as to permit its removal from the camera. In the camera structure just described, it should be noted that the free film loop 148 will remain until the exposure run is completed and at which time the film bump 92 engages the stop member 158. Consequently, if the operator desires to remove the cassette at any earlier time during the exposure run, the film loop would be extending exteriorly of the cassette. In an alternate embodiment, shown in FIGS. 9 and 10, the camera is designed to automatically eliminate the film loop at any time during operation upon opening of the camera door 116. In this arrangement, the door 116 is configured to automatically operate a snubber release mechanism 181 and trigger a fixed time interval, drive switch circuit generally designated at 184.

Figure 9:
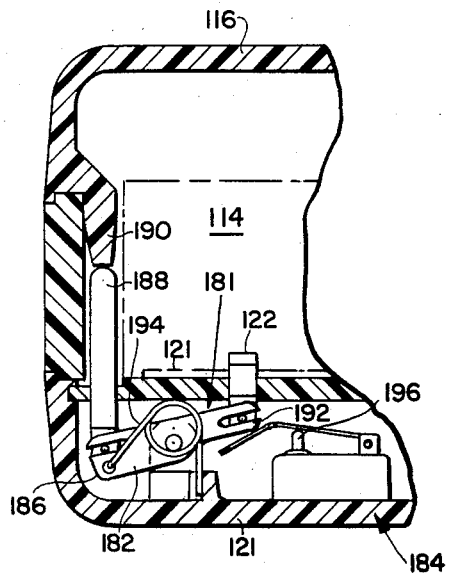
FIG. 9 is a view in elevation of a portion of a camera illustrating a snubber and spool drive control employed in an alternate embodiment of the camera illustrated in FIG. 5.
Figure 11:
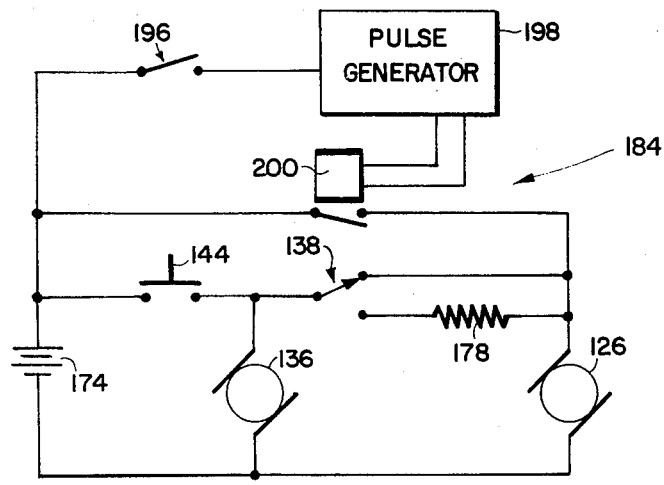
FIG. 11 is a schematic diagram of a portion of the motor control circuit employed with the spool drive control shown in FIG. 10.

As shown in FIG. 9 the snubber release 181 includes a rocker arm 182 connected at one end 186 to an actuating arm 188 which extends upwardly through the base 121 of the pocket 114 so as to engage a lip 190 of the cover 116 when the latter is in its closed position. The other end 192 of the rocker arm 182 is operatively coupled to the snubber 122 and the drive circuit 184. The latter includes a switch 196 and other suitable circuitry as explained below with regard to FIG. 11. A spring member 194 biases the rocker arm to withdraw the snubber 122 and actuate the switch 196 when the cover 116 is open as shown in FIG. 10. This actuation withdraws the snubber lock 122 from the cassette snubber roller 38 (shown in FIG. 1) and additionally couples the spindle drive motor 126 to the battery 174 as shown in FIG. 11. As can be seen from the latter figure, the switch circuit 184 modifies the camera circuitry (previously described with regard to FIG. 8) so as to bypass the trigger switch 144. The switch circuit 184 comprises the switch 196 coupled between the camera battery 174 and a pulse generator 198. Closing of the switch 184 activates the pulse generator which is, for example, a single shot multivibrator or the like so as to provide a pulse of given duration. This pulse in turn activates a relay or other electronic switch designated at 200 which couples the battery 174 to the motor 126 so as to activate the latter. At this time the capstan drive motor 136 remains inactive. Consequently, the claw mechanism 128 and the spindle 120 (shown in FIG. 5) are driven to advance the film further forward within the cassette. Since the capstan drive 136 is inactive during this time, the free loop 148 is therefore eliminated. To minimize the amount of film further advanced by this operation, the pulse generator 198 is designed to provide a single pulse of given duration so as to operate the switch 200 for a precise length of time, for example, to provide one turn of the cassette reel so as to merely take up the approximate length of film stored within the film loop 148. Hence, this arrangement provides means responsive to arranging the camera for removal of the cassette, i.e., opening of the camera door, for eliminating the free loop of film and thereby facilitating removal of the cassette at anytime during the exposure operations.

The snubber latch 122 is released in this embodiment so as to provide further advancement of the film even where the claw has reached the film perforation 88. Hence, in this embodiment the film stop 158 (shown in FIG. 5) which cooperates with the film protuberance is no longer needed. This follows from the fact that without the restriction of the cassette snubber roller 38, the rotation of the take-up spool 28 will advance the film without the aid of the claw.

Advantageously, if the film stop 158 is employed with the circuit shown in FIG. 11, the snubber latch 122 may be left engaged during loop elimination. That is, the snubber 122 may be fixedly positioned on the base 121 of the camera pocket 114, and only the switch circuit 184 activated by the rocker arm 182. In this case, since the snubber latch 122 is not released, operation of the film spool 26 when the cover is opened will only advance the film when the claw is engaging the film perforations. However, the claw is arranged to engage the film perforations at all times except when the claw reaches the first cutout 88 of the film, and operation of the switch 184 and the pulse generator 198 will advance the film at all times except when the end of the film has been reached. In the latter case, however, the stop member 158 will have engaged the film bump 92 and cause the loop to be eliminated. Consequently, the loop of film is eliminated at the end of the film run by the film stop 158 whereas the loop is eliminated at other times by the opening of the door and the activation of the switch circuit 184.

Figure 12:
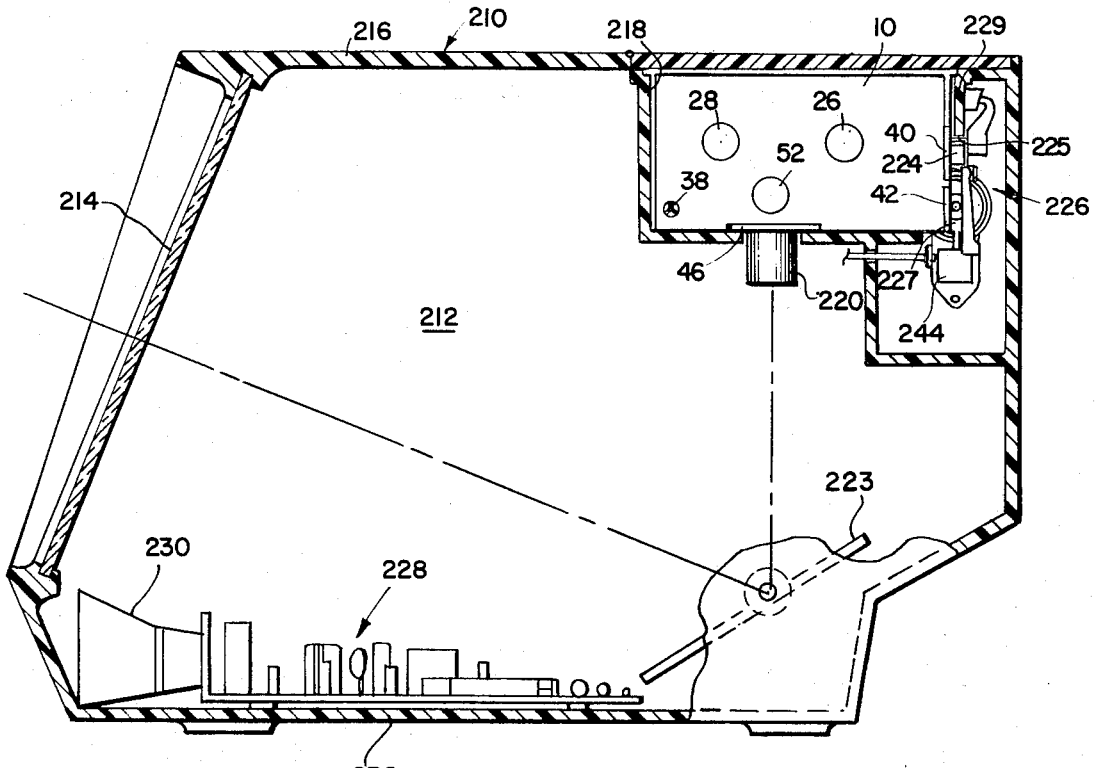
FIG. 12 is a diagrammatic view in elevation partially cut away, of a projector apparatus embodying features of this invention.
Figure 13:
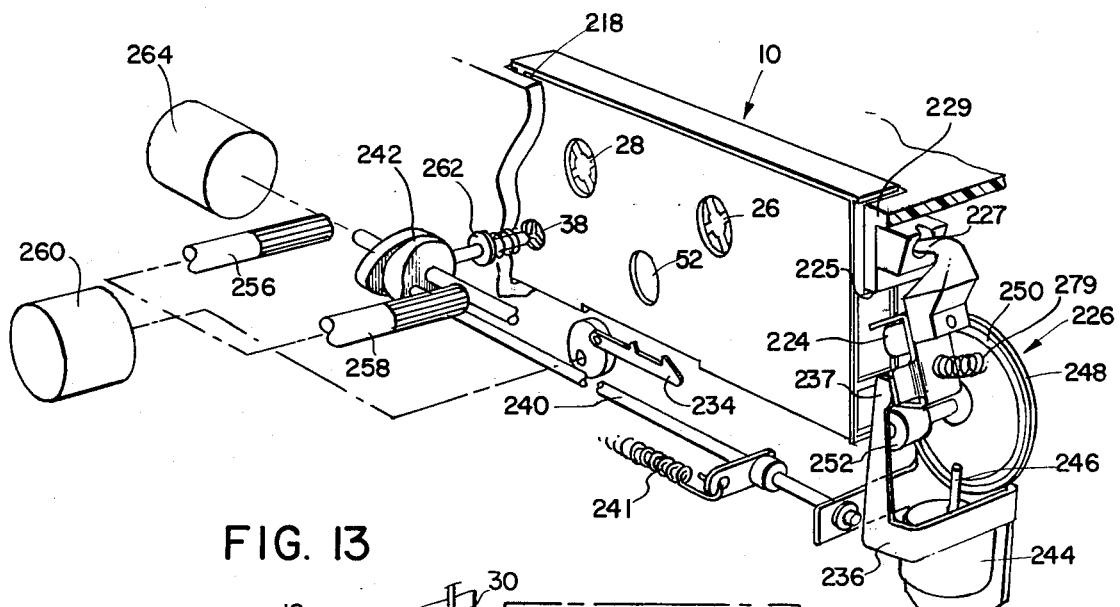
FIG. 13 is a diagrammatic view in perspective illustrating some of the operational mechanisms of the projector shown in FIG. 12.

Following completion of the exposure operation, the cassette 10 is removed from the camera and placed in a combined processor and projection apparatus 210 such as is shown in FIGS. 12 and 13. As can be seen in these figures, the apparatus 210 is illustrated as a rear projection viewer comprising a box-like housing 212 defined in part by a front viewing screen 214. Positioned rearwardly of the screen 214 in adjoining relation to the top surface 216 of the housing 212 is a cassette-receiving slot or well 218 which extends to and is in communication with the top surface. Mounted beneath the cassette-receiving well 218 is a projection lens assembly 220 and a reflector element 223 which in conjunction with a conventional projection lamp (not shown) is configured to project film images forwardly to the rear of the transparent screen 214 once the cassette film has been processed to a viewable condition.

Means are also provided in the apparatus 210 for recording and playback of sound information. These means include a sound-head, indicated at 224, and a capstan drive arrangement 226 which are configured to extend within openings 225 and 227 of one end wall 229 of the cassette well 218. Additionally, appropriate circuitry 228 along with a loudspeaker 230 are provided at the base 232 of the viewer for adequate reproduction of the sound informatioin recorded on the film strip. Further, a microphone (not shown) is included to permit editing and recording of sound information on the film when the cassette is within the viewer 210.

As illustrated in FIG. 13, the magnetic sound-head 224 and the capstan drive arrangement 226 are coupled to a frame member 236 which is pivotal about an axis shown at 238. The frame member 238 is coupled, by means of a linkage or push-rod 240, to a cam 242, which as later explained in regards to the operation of the projector apparatus 210, is configured to displace the sound-head 224 and the capstan drive 226 between an inoperative position shown in FIG. 13 and an operative position shown in FIG. 12 where they are in operative engagement with the cassette 10 and its film strip 30. A spring member 241 appropriately biases the rod 240 into cam following engagement. Carried in the frame 236 is a capstan drive motor 244 which is coupled by means of its drive shaft 246 to a capstan disc 248. As in the previously described camera, the capstan drive disc 248 includes a resilient, high friction surface insert 250 of, for example rubber, which provides a suitable surface contact and compliance with the drive shaft 246. A capstan 252, positioned on the drive disc 248, is rotatably driven in accordance with operation of the capstan drive motor 244.

The magnetic head 224 is carried on a support 225 which is mounted for pivotal movement at one end 227. A spring 229 biases the head support 225 towards the cassette receiving well 218 and into engagement with an upwardly extending arm 237 of the frame 236. The arm 237 in conjunction with the spring 229 couples the soundhead 224 to the capstan drive arrangement 226 so that both are displaced between their operative and inoperative positions in accordance with the rotational position of the cam 242.

Prior to completing the description of the apparatus 210, it should be noted that this viewer is designed also to process the exposed film strip to a viewable condition prior to projection. Examplary structure suitable for such processing is set forth in detail in the commonly assigned, copending patent application Ser. No. 227,080, Edwin H. Land filed on Feb. 17, 1972. In regards to the processing operation, it should be noted that when the cassette 10 is removed from the camera 96, at least a substantial portion of the film strip 30 has been transported from the supply spool 26 to the take-up spool 28. As previously indicated, the camera is intended to stop before the supply end of the film strip is reached. That is, it is preferred to advance the film beyond the exposure termination point established in the camera just prior to applying processing composition to the exposed film. Hence, as described in the aforementioned application Ser. No. 227,080 a double pawl claw 234 is employed in the projector 210. This claw 234 will advance the film beyond the first termination point due to its double pawl until the latter reaches the second termination point, or that is, the second elongated opening 90.

Overall advancement of the film within the cassette 10 is carried out in the projector 210 by a pair of spindle drives designated at 256 and 258, which as later explained, are driven along with the claw 234 by means of a second drive motor shown at 260. The spindles 256 and 258 are coupled to the drive motor 260 through appropriate, selectively operated clutches (not shown) so as to reversibly transport the film between the supply reel 26 and the take-up reel 28 of the cassette 10. Additionally, to accomplish the overall operation of the projector 210, motion sensing devices (not shown) are coupled to the spindles 256 or 258 so as to indicate stoppage of either of the film reels occurring when the film strip 30 has been substantially completely transported from one to the other. Further, as more fully explained in the aforementioned application Ser. No. 227,080 the projector 210 is programmed by means (not shown) to reverse motor 260 and control the position of the cam 242 in response to these motion sensing devices and in accordance with the particular stage of the processing and projection operation as later explained with respect to the overall operation of the projector.

To control film snubbing within the cassette 10, a snubber latch 262 is also coupled to the cam 242 and appropriately displaced into latching engagement with the snubber roll 38 of the cassette in co-ordination with displacement of the sound mechanism 226 into cassette engagement. These engagements are achieved by a cam drive motor, such as a stepping motor designated at 264.

Figure 14:
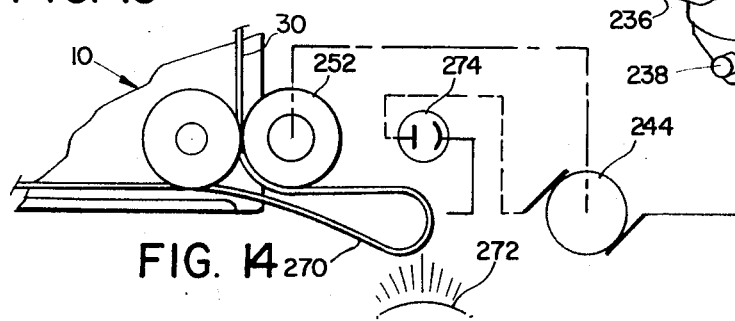
FIG. 14 is a detailed view of a loop control arrangement employed in the projector apparatus of FIG. 12.

As in the camera 96, the constant speed advancement of the film strip 30 in the area of the capstan is isolated from the intermittent claw advancement by a loop of film 270, illustrated in FIG. 14, which extends through the opening 42 of the cassette 10 and the opening 227 of the side wall 279 of the cassette-receiving well 218.

In this arrangement, a lamp 272 (emitting nonactinic radiation as regards the film) operates in conjunction with a photocell 274 to control the speed of the capstan drive motor 244 so as to form the film loop 270 and thereafter maintain it within predetermined limits. The capstan motor 244 is initially operated so as to advance the film at a speed slightly in excess of the average speed of film advancement produced by the claw. Then, once the film loop 270 is of sufficient size to intercept the light directed to the photocell 274, the latter reduces the capstan motor speed slightly (by switching on appropriate resistor in series with the motor 244) so as to allow the size of the loop to be reduced. The loop is then automatically maintained within this predetermined size. Although the capstan speed is varied to maintain the loop size, the variation is not abrupt and is only a slight change such that the sound reproduction remains adequate. Such a system is described in detail in the commonly assigned application Ser. No. (Case No. 4870) of D. T. Scholz, filed herewith.

Since in the preferred embodiment, the claw drive motor 260 is a motor former device through which voltage is directed to other components, such as the projection lamp (not shown) of the projector 210, it is preferable to vary the capstan motor 126. It should be understood, however, that in some applications, the system described for the camera 96 could also be employed in the projector 210. In this regard, it should also be noted that the sensor-switch arrangement for maintaining the loop of film in camera 96 would be utilized in the projector 210 instead of the lamp and photocell arrangement shown in FIG. 14.

The projector operation will now be described. As previously noted, when the cassette 10 is first inserted in the receiving well 218, following exposure, the projector automatically processes the film strip 30 and then projects the viewable images while also reproducing the recorded sound.

Overall control of the projector program is provided in part by a cam mechanism (not shown) which is designed to first initiate forward advancement of the film, from the supply reel 26 to the take-up reel 28, while projecting the film images etc., rewind the film back to the supply spool and eject the cassette. For an unprocessed cassette, the forward and rewind cycle is repeated twice prior to ejection and the projection operations are prevented during the first transport cycle. This is accomplished by means of an indicator (not shown) carried on the cassette which provides a signal to the projector 210 to indicate the processed or unprocessed condition of the film strip.

Hence, in response to cassette insertion in the projector 210, the cassette is automatically operated through a pre-programmed sequence to either process and project the film or to merely project and rewind the latter. In either case, the projector is pre-programmed to initially engage the claw mechanism 234 and to drive the take-up spindle 256 so as to advance the film to the take-up spool 28. At this time, the capstan drive motor is also energized and the cam mechanism 242 rotated by drive motor 264 so as to engage the snubber latch 262 with the snubber roll 38 and to bring the soundhead 224 and the capstan into operative engagement with the film strip 30. With an unprocessed cassette, the projection lamp is held off at this time. As the film strip is advanced forward, only a short distance beyond the camera termination point, the film discontinuity 92 engages the film support pad 72 so as to displace the latter to its processing position where it supports the film strip 30 beneath the cassette processor 60. Hence, the film discontinuity or bump 92 cooperates with the stop 158 in the camera to eliminate the film loop, and then activates the processor.

Since the film has not been previously processed, the claw is capable of only advancing the film a short distance before the second elongated sprocket hole is reached and film advancement terminated. At this time, the snubber 262 prevents further take-up of the film by the take-up reel 28 which stops further motion of the take-up spindle 256. Further, although the capstan continues to rotate, the end of the film is reached at the supply reel 26 which also stops the spindle 258. This stopping of the spindles signals the projector to disengage the claw, rotate the cam 242 to disengage the snubber latch and the capstan, and reverse the direction of the film drive motor 260 thereby rewinding the film strip to the supply spool 26, during which time the fluid is released and processing of the film strip 30 occurs. That is, as the first rewind of the film strip 30 is initiated, the tab actuating assembly 66 is operatively engaged by a reversal of the supply spool 26 so as to release the fluid 64 from the reservoir 62 and to the film strip thereby providing a layer of processing fluid on the film strip as the latter is returned to the supply spool 28. During this interval, light is precluded from entering the projection station by means of a blinder member (not shown) which is interposed in the projection path.

Once the film strip 30 has been completely rewound on the supply spool 26, the spindle motion again ceases. Since the cassette was previously unprocessed, and has so signalled the projector, the film transport cycle is again repeated such that the film is forwardly advanced, during which projection operations are initiated and the drying of the film strip is completed. Specifically, once the spindle motion ceases at the end of this process rewind, the projector 210 programs the cassette through a projection and an audio playback mode. That is, the projector 210 now operates the just processed cassette in a manner substantially identical to that of a previously processed cassette as explained below.

Consequently, following the process rewind or upon insertion of a previously processed cassette in the projector 210, the cam drive motor 264 is activated so as to displace the snubber latch 262 into cassette engagement and to operate push rod 240 so as to displace the soundhead 224 and the capstan into film engagement. At this time, operation of both the capstan drive motor 246 and the claw drive motor 260 are initiated, the claw drive motor being energized so as to drive the claw and the take-up spindle 256 to incrementally advance the film strip 30 in a forward direction across the exposure-projection opening 46. The projection lamp (not shown) is energized so as to direct a beam of light through the incremental portions of the film strip presented at the exposure-projection station so as to display the recorded images.

As the claw 234 advances the film incrementally across the exposure station 46, the capstan also advances the film strip 30 across the magnetic soundhead 224. Initially, the advancement of the film due to the capstan is faster than the average advancement due to the claw such that the free film loop is formed. As indicated previously, the size of the loop is then controlled by the light 272 and photocell 274 which operate to slowly speed up and slow down the capstan drive motor 246.

During this operation, the sound-head is operative in conjunction with the speaker 230 to play back sound previously recorded on the film track during the camera operation. Upon completion of the forward advancement of the film during projection and playback, the film 30 is again rewound in the manner described with regards to processing rewind, and the cassette 10 is partially ejected from the projector 210 to complete the program.

It should be noted that inasmuch as the film strip is always rewound during which time the capstan mechanism is inoperative, i.e., displaced from the cassette 10, the loop 270 is eliminated prior to removal of the cassette from the projector 210.

Those familiar with the motion picture arts will readily appreciate the novel and highly unique advantages of this audio-visual system employing a highly compact cassette in which the film is permanently retained, in conjunction with camera and projector apparatus providing both recording and playback of audio and visual information. The apparatus cooperates with the cassette to automatically form, control and to subsequently remove an isolating film loop located between the audio and exposure-projection stations of the cassette.

This invention may be practiced or embodied in still other ways without departing from the spirit or essential character thereof. The preferred embodiments described herein are therefore illustrative and not restricted, the scope of the invention being indicated by the appended claims and all variations which come within the meaning of the claims are intended to be embraced therein.

I claim:

1. A camera comprising:
 a substantially light-tight camera housing;
 means for receiving a film cassette in operative relation with said camera housing, such cassette including a cassette housing configured for retaining a strip of photographic film material, such cassette housing including a first opening configured for film exposure operations and opening defining means configured for sound operations;
 selectively operative means for cooperating with such film strip when such cassette is operatively positioned within said receiving means for advancing such film strip serially across such openings, said advancing means including a first drive means for intermittently advancing incremental portions of such film strip across such first opening and a second drive means for substantially constantly advancing such film strip across such opening defining means;
 means located in operative relation with such first opening for exposing such incremental portions of such film strip at said first opening so as to record scene images thereon;
 means including a sound-head mounted in said camera housing in operative relation with said opening defining means for providing sound recording upon or sound reproduction from such film strip;
 means located in said camera housing in operative relation to such opening defining means for receiving a loop of such film strip extending through such opening defining means; and
 means located in said loop receiving means for controlling at least one of said drive means to extend a portion of such film strip through such opening defining means and into said loop receiving means while other portions of such film strip to either side of such loop remain within such cassette housing so as to thereby initially form a loop of film extending from such cassette housing and for thereafter controlling the size of such loop during the advancement of such film strip so that with such cassette mounted in said camera such film strip may be exposed and sound recorded thereon without removing it from such cassette, such loop serving to isolate the constantly advanced portions of such film strip from the intermittently advanced portions thereof.

2. The camera of claim 1 wherein said control means is configured to vary the operation of said first drive means between one value advancing such film strip at an average speed less than the advancement of such film strip by said second means and a second value advancing such film strip at an average speed greater than such advancement by said second drive means.

3. The camera of claim 1 wherein said advancing means is operative to advance such film strip in a direction passing first across such opening defining means and then across said first opening, and said control means is configured to vary the operation of said first drive means between an initial value which advances such film strip at an average speed less than the advancement of such film strip by said second drive means and a second value which advances such film strip at an average speed slightly greater than such advancement by said second drive means.

4. The camera of claim 1 wherein said second drive means includes means is configured to enter one end of such opening defining means furthest removed from said first opening and to advance such film towards the other end of such opening defining means and towards such first opening so as to form such loop of film extending through such opening defining means in adjoining relation to such other end thereof.

5. The camera of claim 4 wherein such opening defining means includes a second and third opening configured to receive said second drive means and said sound-head respectively said third opening located on the other side of second opening from such first opening such that such film strip is drawn across said sound-head at substantially constant speed by such second drive means operating in such second opening.

6. Projector apparatus comprising:
 an apparatus housing;
 means for receiving a film-handling cassette, such cassette including a cassette housing configured for retaining a strip of photographic material, such cassette housing including a first opening configured for projection of images retained on such a film strip, and opening defining means configured for operation of an audio program with such film strip, said cassette-receiving means including a plurality of walls configured to closely conform to such cassette housing and forming a well-like arrangement having an open end in communication with one surface of said apparatus housing, said walls including a first opening adjoining such first cassette opening when such cassette is operatively located in said receiving means so as to permit passage of image carrying rays from such first opening and an opening defining means located adjoining such opening defining means of such cassette so as to permit extension of a loop of such film exteriorly of such cassette;

image forming means located in operative relation with said first opening in said walls when such cassette is positioned in said receiving means;

means including a sound-head located in operative relation with said opening defining means in said walls when such cassette is located in said receiving means for providing sound recording upon or sound reproduction from such film strip;

means for advancing such film strip serially across such first cassette opening and such opening defining means, said advancing means including first drive means for intermittently advancing incremental portions of such film strip across such first cassette opening and second drive means for substantially constantly advancing such film strip across such cassette opening defining means; and means for controlling at least one of said drive means to extend a portion of such film strip through such opening defining means of such cassette and said opening defining means of said walls while other portions of such film strip to either side of such loop remain within such cassette housing so as to initially form a loop of film extending from such cassette housing and for thereafter controlling the size of such loop during the advancement of such film strip so that with such cassette mounted in said projector such film strip may be projected and sound recorded thereon or played back therefrom without removing it from such cassette, such loop serving to isolate the constantly advanced portions of such film strip from the intermittently advanced portions thereof.

7. The apparatus of claim 6 wherein said second drive means includes a capstan configured to enter such opening defining means intermediate said sound-head and said first opening and operative to advance such film strip toward said first opening so as to draw such film strip across said sound-head.

8. Photographic apparatus comprising:
an apparatus housing;
means for receiving a film cassette, such cassette including a cassette housing configured for retaining a strip of photographic film material, such cassette housing including a first station for cooperating with said apparatus so as to provide a photographic operation with such film strip and a second station configured for cooperating with said apparatus so as to provide an audio operation with such film strip, such second station including opening defining means;

selectively operative means for cooperating with such first cassette station for providing a photographic program with such film strip thereat, said photographic program means including a first drive means for intermittently advancing such film strip in a given direction along a given path so as to present progressive incremental sections of such film strip at such first station;

selectively operative means for cooperating with such second cassette station for providing an audio program with such film strip thereat, said audio program means including a second drive means for substantially constantly advancing such film strip in said given direction along said given path through such second cassette station;

means providing a substantially light-tight area located in said apparatus housing in operative relation to such opening defining means when such cassette is mounted in said receiving means for receiving a loop of film extending through such opening defining means;

and means for controlling at least one of said drive means to extend a portion of such film strip through such opening defining means and into said loop receiving means while portions of such film strip to either side of such loop remain within such cassette housing so as to initially form a loop of film extending from such cassette housing and for thereafter controlling the size of such loop during the advancement of such film strip so that with such cassette mounted in said apparatus such film strip may be exposed or projected and sound recorded thereon or played back therefrom without removing it from such cassette, such loop serving to isolate the constantly advanced portions of such film strip from the intermittently advanced portions thereof, said controlling means including means for controlling at least one of said drive means so as to initially advance such film through such second station and towards said first station at a rate initially exceeding the average advancement of such film strip through such first station.

9. The apparatus of claim 8 wherein said means for controlling said drive means includes a loop sensor located in said loop receiving means configured to vary the relative rate of film advancement by one of said drive means so as to maintain the size of said loop within a predetermined range.

10. Photographic apparatus comprising:
an apparatus housing;
means for receiving a film cassette in an operative location within said apparatus housing, such cassette including a cassette housing configured for retaining a strip of photographic film material, a first station configured for photographic operations, and a second station configured for sound operations, such second station including opening defining means;

means for operating such cassette to perform such photographic and sound programs therewith, said operating means including means for advancing such film strip serially along a given path through such first and second stations, said advancing means including first drive means for intermittently advancing such film strip through such first station and second drive means for advancing such film strip at a substantially constant speed through such second station;

means located in said apparatus housing in operative relation to such opening defining means when such cassette is mounted in said receiving means for receiving a loop of film extending through such opening defining means; and means located in said loop receiving means for controlling the average speed of film advancement of at least one of said drive means so as to extend a portion of such film strip intermediate such stations through such opening defining means and into said loop receiving means while portions of such film strip to either side of such loop remain within such cassette housing so as to initially form a loop of film extending from such cassette housing, and for thereafter controlling the size of such loop during the advancement of such film strip, and for drawing such film loop back into such cassette housing at the completion of such photographic and sound programs so as to facilitate removal of such cassette from said receiving means so that with such cassette mounted in said apparatus such programs may be performed on such film strip without removing it from such cassette, such loop serving to isolate the constantly advanced portions of such film strip from the intermittently advanced portions thereof.

11. The apparatus of claim 10 including means for retaining such cassette within said cassette receiving means, and said controlling means includes means for drawing such loop back into such cassette responsive to release of said retaining means.

12. A photographic system comprising:
a cassette comprising:
  a strip of photographic film material;
  a cassette housing for retaining said strip of film, said housing including an opening for facilitating photographic operations with said film strip and opening defining means for facilitating audio operations; and
an apparatus comprising:
  an apparatus housing;
  means for receiving said film handling cassette, said cassette-receiving means including a plurality of walls configured to closely conform to said cassette housing and forming a well-like arrangement having an open end in communication with one surface of said apparatus housing, said walls including a first opening located adjoining said cassette opening when such cassette is operatively located in said receiving means so as to permit passage of image carrying rays through said first opening, and opening defining means located adjoining said cassette opening defining means so as to permit extension of a loop of such film exteriorly of such cassette;
  image forming means operatively associated with said opening in said walls;
  a sound-head operatively associated with said opening defining means in said walls;
  means for cooperating within such film strip for advancing such film strip serially across said opening and said opening defining means of said cassette, said advancing means including first drive means for intermittently advancing incremental portions of such film strip across said cassette opening and second drive means for substantially constantly advancing such film strip across said cassette opening defining means; and
  means for controlling at least one of said drive means to extend a portion of said film strip through both said cassette opening defining means and said opening defining means of said receiving means while portions of such film strip to either side of such loop remain within said cassette housing so as to initially form a loop of film extending from said cassette housing and for thereafter controlling the size of such loop during the advancement of said film strip so that with said cassette mounted in said apparatus said film strip may be exposed or projected and sound recorded thereon or played back therefrom without removing it from said cassette, such loop serving to isolate the constantly advanced portions of said film strip from the intermittently advanced portions thereof.

13. A photographic system comprising:
a film handling cassette comprising:
  a strip of photographic film material;
  a cassette housing for retaining said film strip, said housing including a first opening for facilitating performance of a photographic program with said film strip and opening defining means for facilitating performance of an audio program with said film strip;
an apparatus comprising:
  an apparatus housing;
  means for receiving a film cassette in operative relation with said apparatus housing;
  selectively operative means for cooperating with said film strip when said cassette is operatively positioned within said receiving means for advancing said film strip serially across said opening defining means and said first opening, said advancing means including a first drive means for intermittently advancing incremental portions of such film strip across said first opening and a second drive means for substantially constantly advancing such film strip across said opening defining means;
  means located in operative relation with said first opening for cooperating with said incremental portions of such film strip at said first opening so as to record scene images thereon;
  means including a sound-head mounted in said camera housing in operative relation with said opening defining means for providing sound recording upon or sound reproduction from such film strip;
  means located in said camera housing in operative relation to said opening defining means for accommodating a loop of such film strip extending therethrough, said accommodating means forming with said cassettes a substantially light-tight area for accommodating such loop; and
  means located in part in said loop accommodating means for controlling at least one of said drive means to extend a portion of said film strip through said opening defining means and into said loop accommodating means while other portions of said film strip to either side of said loop remain within said cassette housing so as to thereby initially form a loop of film extending from said cassette housing and for thereafter controlling the size of such loop during the advancement of said film strip so that with said cassette mounted in said camera said film strip may be exposed and sound recorded thereon without removing it from said cassette, such loop serving to isolate the constantly advanced portions of said film strip from the intermittently advanced portions thereof.

14. A projector apparatus comprising:
a substantially light-tight apparatus housing;
means for receiving a film cassette in operative relation with said apparatus housing, such cassette including a cassette housing configured for retaining a strip of photographic film material, such cassette housing including a first opening configured for film exposure operations and opening defining means configured for sound operations;

selectively operative means for cooperating with such film strip when such cassette is operatively positioned within said receiving means for advancing such film strip serially across such opening defining means and such first opening, said advancing means including a first drive means for intermittently advancing incremental portions of such film strip across such first opening and a second drive means for substantially constantly advancing such film strip across such opening defining means;

means located in operative relation with such first opening for projecting images from such incremental portions of such film strip presented at said first opening;

means including a sound-head mounted in said camera housing in operative relation with such opening defining means for providing sound recording upon or sound reproduction from such film strip;

means located in said camera housing in operative relation to such opening defining means for accommodating a loop of such film strip extending through such opening defining means, said loop accommodating means forming with such cassette a substantially light-tight area for accommodating such film loop; and means located in part in said loop accommodating means for controlling at least one of said drive means to extend a portion of such film strip through such opening defining means and into said loop accommodating means while other portions of such film strip to either side of such loop remain within such cassette housing so as to thereby initially form a loop of film extending from such cassette housing and for thereafter controlling the size of such loop during the advancement of such film strip so that with such cassette mounted in said apparatus housing such film strip may be projected and sound recorded thereon or reproduced therefrom without removing it from such cassette, such loop serving to isolate the constantly advanced portions of such film strip from the intermittently advanced portions thereof.

15. Photographic apparatus comprising:

an apparatus housing;

means for receiving a film cassette in an operative location within said apparatus housing, such cassette including a cassette housing configured for retaining a strip of photographic film material, such film strip including a discontinuity located near the trailing end thereof, a first station configured for photographic operations, and a second station configured for sound operations, such second station including opening defining means;

means for operating such cassette to perform such photographic and sound programs therewith, said operating means including means for advancing such film strip serially along a given path through such first and second stations, said advancing means including first drive means for intermittently advancing such film strip through such first station and second drive means for advancing such film strip at a substantially constant speed through such second station;

means located in said apparatus housing in operative relation to such opening defining means when such cassette is mounted in said receiving means for receiving a loop of film extending through such opening defining means; and means located in said loop receiving means for controlling the average speed of film advancement of at least one of said drive means so as to extend a portion of such film strip intermediate such stations through such opening defining means and into said loop receiving means while portions of such film strip to either side of such loop remain within such cassette housing so as to initially form a loop of film extending from such cassette housing, for thereafter controlling the size of such loop during the advancement of such film strip, and for drawing such film loop back into such cassette housing at the completion of such photographic and sound programs so as to facilitate removal of such cassette from said receiving means so that with such cassette mounted in said apparatus such programs may be performed on such film strip without removing it from such cassette, such loop serving to isolate the constantly advanced portions of such film strip from the intermittently advanced portions thereof;

said apparatus including stop means located in adjoining relation to such given path and at a point prior to such film loop, said stop means configured for cooperating with such discontinuity of such film strip to prevent further advancement of such film strip by said second drive means prior to stopping advancement of such film strip by said first drive means so as to thereby withdraw such film loop back into such cassette housing.

16. The apparatus claimed in claim 15 wherein such cassette includes a processing station and such film discontinuity is additionally configured for cooperating with such processing station to facilitate film processing.

17. Photographic apparatus comprising:

an apparatus housing;

means for receiving a film cassette in an operative location within said apparatus housing, such cassette including a cassette housing configured for retaining a strip of photographic film material, a first station configured for photographic operations, and a second station configured for sound operations, such second station including opening defining means;

means for operating such cassette to perform such photographic and sound programs therewith said operating means including means for advancing such film strip serially along a given path through such first and second stations, said advancing means including first drive means for intermittently advancing such film strip through such first station and second drive means for advancing such film strip at a substantially constant speed through such second station;

means located in said apparatus housing in operative relation to such opening defining means when such cassette is mounted in said receiving means for receiving a loop of film extending through such opening defining means; and means located in said loop receiving means for controlling the average speed of film advancement of at least one of said drive means so as to extend a portion of such film strip intermediate such stations through such opening defining means and into said loop receiving means while portions of such film strip to either side of such loop remain within such cassette housing so as to initially form a loop of film extending from such cassette housing, for thereafter controlling the size of such loop during the advancement of such film strip, and for withdrawing such film loop back into such cassette housing at the completion of such photographic and sound programs so as to facilitate removal of such cassette from said receiving means so that with such cassette mounted in said apparatus such programs may be performed on such film strip without removing it from such cassette, such loop serving to isolate the constantly advanced portions of such film strip from the intermittently advanced portions thereof;

said means for drawing such film loop back into such cassette includes means for precluding advancement of such film strip through such second station while further advancing such film strip through such first station so as to reduce the length of film stored between said first and second stations and to thereby withdraw such film loop back into such cassette housing.

18. Photographic apparatus comprising:

an apparatus housing;

means for receiving a film cassette in an operative location within said apparatus housing, such cassette including a cassette housing configured for retaining a strip of photographic film material, a first station configured for photographic operations, and a second station configured for sound operations, such second station including opening defining means;

means for operating such cassette to perform such photographic and sound programs therewith, said operating means including means for advancing such film strip serially along a given path through such first and second stations, said advancing means including first drive means for intermittently advancing such film strip through such first station and second drive means for advancing such film strip at a substantially constant speed through such second station;

means located in said apparatus housing in operative relation to such opening defining means when such cassette is mounted in said receiving means for receiving a loop of film extending through such opening defining means; and means located in said loop receiving means for controlling the average speed of film advancement of at least one of said drive means so as to extend a portion of such film strip intermediate such stations through such opening defining means and into said loop receiving means while portions of such film strip to either side of such loop remain within such cassette housing so as to initially form a loop of film extending from such cassette housing, for thereafter controlling the size of such loop during the advancement of such film strip, and for drawing such film loop back into such cassette housing at the completion of such photographic and sound programs so as to facilitate removal of such cassette from said receiving means so that with such cassette mounted in said apparatus such programs may be performed on such film strip without removing it from such cassette, such loop serving to isolate the constantly advanced portions of such film strip from the intermittently advanced portions thereof; and a door member configured for displacement between a blocking and unblocking position over said receiving means so as to respectively retain such cassette within said receiving means or permit its removal therefrom, and said controlling means includes means for drawing such film loop back into such cassette responsive to displacement of said door member from its blocking towards its unblocking position.

19. Photographic apparatus comprising:

an apparatus housing;

means for receiving a film cassette in an operative location within said apparatus housing, such cassette including a cassette housing configured for retaining a strip of photographic film material, a first station configured for photographic operations, and a second station configured for sound operations, such second station including opening defining means;

means for operating such cassette to perform such photographic and sound programs therewith, said operating means including means for advancing such film strip serially along a given path through such first and second stations, said advancing means including first drive means for intermittently advancing such film strip through such first station and second drive means for advancing such film strip at a substantially constant speed through such second station, said second drive means being displaceable between a first operative position wherein it is in operative engagement with such film strip and a second inoperative position wherein it is not in operative engagement with such film strip;

means located in said apparatus housing in operative relation to such opening defining means when such cassette is mounted in said receiving means for receiving a loop of film extending through such opening defining means; and means located in said loop receiving means for controlling the average speed of film advancement of at least one of said drive means so as to extend a portion of such film strip intermediate such stations through such opening defining means and into said loop receiving means while portions of such film strip to either side of such loop remain within such cassette housing so as to initially form a loop of film extending from such cassette housing, for thereafter controlling the size of such loop during the advancement of such film strip, and for drawing such film loop back into such cassette housing at the completion of such photographic and sound programs so as to facilitate removal of such cassette from said receiving means so that with such cassette mounted in said apparatus such programs may be performed on such film strip without removing it from such cassette, such loop serving to isolate the constantly advanced portions of such film strip from the intermittently advanced portions thereof, said withdrawing means including means for retaining said drive means in its said second inoperative position while advancing a short length of such film strip through said first station.

* * * * *